United States Patent [19]
Jacob

[11] Patent Number: 5,903,997
[45] Date of Patent: May 18, 1999

[54] HUNTING DECOY BLIND AND CART

[76] Inventor: James L. Jacob, 143 N. Dacey, Bentley, Kans. 67016-0244

[21] Appl. No.: 09/045,287

[22] Filed: Mar. 20, 1998

[51] Int. Cl.$^6$ .................................................. A01M 31/06
[52] U.S. Cl. ...................... 43/1; 43/2; 280/47.3; 135/901
[58] Field of Search .............................. 43/1–3; 280/47.3, 280/47.31, 47.32, 78, 47.18; 135/901; 446/470; D22/199

[56]                References Cited

U.S. PATENT DOCUMENTS

| | | | |
|---|---|---|---|
| 17,192 | 5/1857 | Bogle | 43/3 |
| D. 82,531 | 11/1930 | Wetzell | 280/47.31 |
| 120,736 | 11/1871 | Gehr | 280/47.3 |
| 2,624,588 | 1/1953 | Jones | 280/9 |
| 3,236,537 | 2/1966 | Eckman | 280/47.18 |
| 3,560,015 | 2/1971 | Tracy et al. | 280/47.3 |
| 3,622,201 | 11/1971 | Radig | 135/901 |
| 3,787,912 | 1/1974 | Huey, Jr. | 43/1 |
| 4,045,040 | 8/1977 | Fails | 280/1.5 |
| 4,581,837 | 4/1986 | Powlus | 43/1 |
| 4,689,913 | 9/1987 | Brice | 43/3 |
| 4,751,936 | 6/1988 | Zibble et al. | 135/901 |
| 5,075,999 | 12/1991 | Fredericks | 43/1 |
| 5,564,720 | 10/1996 | Stringer | 280/30 |
| 5,678,346 | 10/1997 | Kellett | 43/2 |
| 5,787,632 | 8/1998 | Kraut | 43/1 |
| 5,803,694 | 9/1998 | Steele | 135/901 |
| 5,806,878 | 9/1998 | Mroczka et al. | 280/47.31 |
| 5,820,141 | 10/1998 | Wilkerson et al. | 280/47.3 |

OTHER PUBLICATIONS

Cabela's Master Catalog 1997—Fall 1997 pp. 376 & 377.
Cabela's Master Catalog 1996—Fall 1996 p. 330.

*Primary Examiner*—Michael J. Carone
*Assistant Examiner*—Darren W. Ark
*Attorney, Agent, or Firm*—Edward L. Brown, Jr.

[57]                ABSTRACT

The present invention is a decoy hunting blind and cart which both provides a goose blind structure and functions as a cart. The hunting blind and cart positions an enlarged decoy directly over a hunter reclining on a flexible hammock provided on the cart which holds the hunter slightly off the ground. Offset to one side of the cart is a support framework for the enlarged decoy, which is easily rotated out of the way permitting the hunter to shoot. The hunting cart is a wheelbarrow like structure which permits the hunter to transport all of his decoys which are set up in the field to various locations.

6 Claims, 2 Drawing Sheets

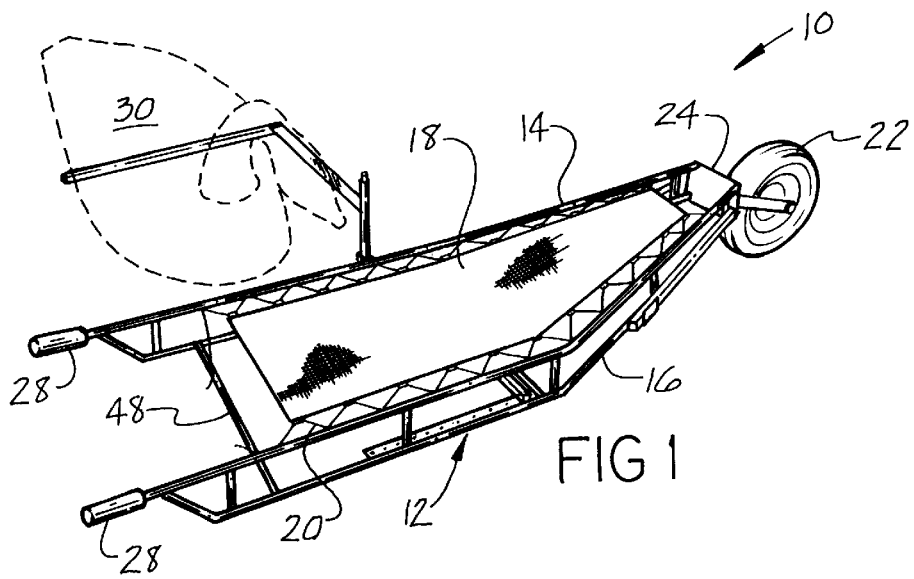
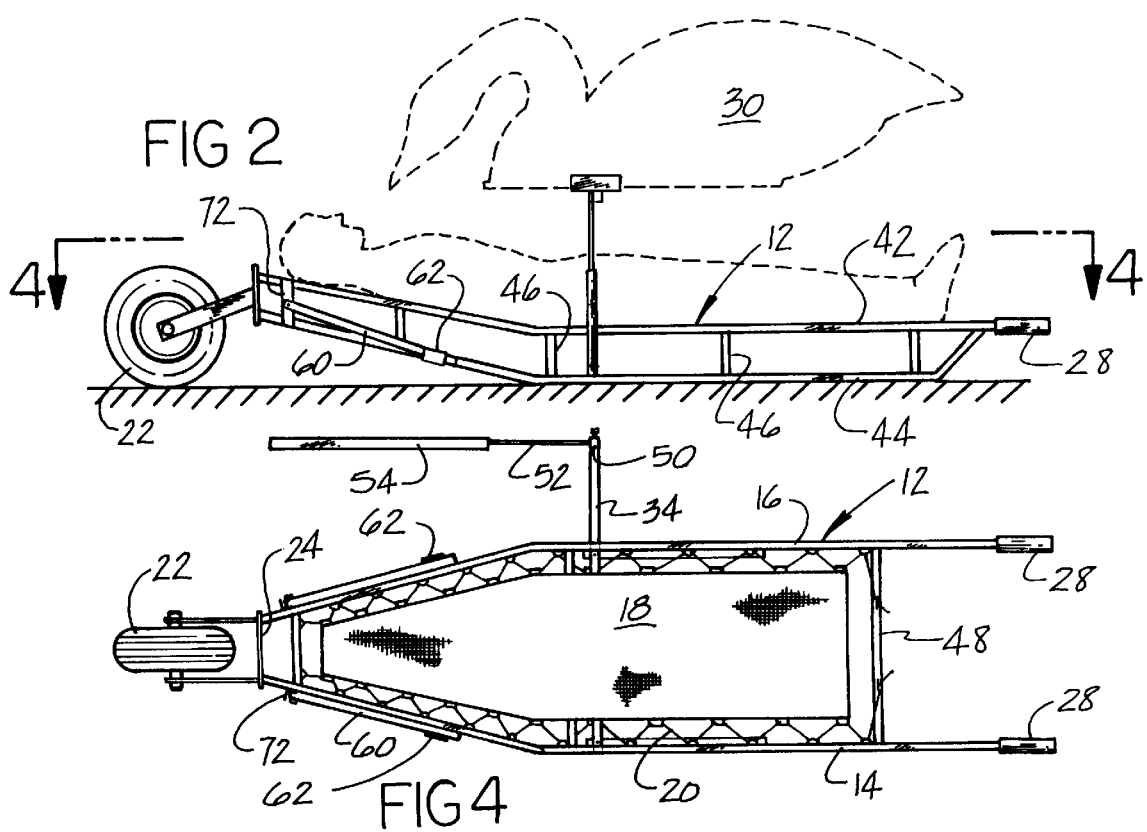

HUNTING DECOY BLIND AND CART

BACKGROUND OF THE INVENTION

The invention relates to hunting blinds and more specifically to a goose blind for a single hunter which also functions as a cart for transporting decoys and other materials.

Open field hunting of geese requires the use of numerous goose decoys which are spread out in a field to attract overflying geese and a blind in some form to hide the hunter since the geese will shy from any visible human. Duck and geese blinds have been around since early times and they include a variety of different structures. Pits dug in the ground have very limited versatility since they are not movable and are frequently filled with rain water. Portable blinds such as small tent-like structures, which can be quickly thrown over have been developed in more recent times. The general idea of hiding the hunter inside a very large decoy is taught in U.S. Pat. No. 5,075,999. This complex structure provides a decoy shape larger than the hunter with a pair of outwardly swinging doors which can be opened at the time of shooting. Another type of decoy-like blind is taught in U.S. Pat. No. 4,689,913.

Goose-shaped blinds are also illustrated in Cabelas Master Catalog for 1997, which illustrate two additional blind configurations having the shape of a goose.

It's often necessary for hunters to travel substantial distances into various remote areas to hunt various types of game including ducks and geese. Game carrying carts for transporting either the game or equipment such as decoys have been around for many years as typified in U.S. Pat. No. 3,236,537; U.S. Pat. No. 5,564,720; U.S. Pat. No. 2,624,588; and U.S. Pat. No. 4,045,040.

SUMMARY OF THE INVENTION

While most of the light weight blind structures mentioned above involve fully encompassing the hunter, the present invention is somewhat different in that it positions an enlarged decoy directly over a reclining hunter. The frame of the hunting cart provides a flexible hammock structure which holds the reclining hunter slightly off the ground. Offset to one side of the cart is a support framework for the enlarged decoy, which is easily rotated out of the way permitting the hunter to shoot. The hunting cart is a wheelbarrow like structure which permits the hunter to transport all of his decoys which are set up in the field to various locations with a minimum of effort on the hunter's part. The logistics of moving 20–30 large goose decoys; in and out of an open field hunting site can be substantial and the blind and cart structure of the present invention provides a much simplified method.

It is therefore the principal object of the present invention to provide a goose blind structure, which also functions as a hunting cart.

Another object of the present invention to provide a goose blind which is very comfortable to a reclining hunter with a maximum of hunter visibility.

A further object of the present invention is to provide a new and improved hunting cart for transporting a large volume of light weight decoys.

These objects along with various features and novelty which characterize the invention, are pointed out with particularity in the claims and form a part of this disclosure. For better understanding of the invention, reference should be had to the accompanying drawings and descriptive matter in which is illustrated the preferred embodiments of the invention.

BRIEF DESCRIPTION OF THE DRAWINGS

FIG. 1 is a perspective view of the present invention with the decoy swung to one side;

FIG. 2 is a side elevational view with the decoy positioned directly over the reclining hunter;

FIG. 4 is a top view of the hunting cart with the decoy removed from the support framework;

DESCRIPTION OF THE PREFERRED EMBODIMENT

Figure 5:
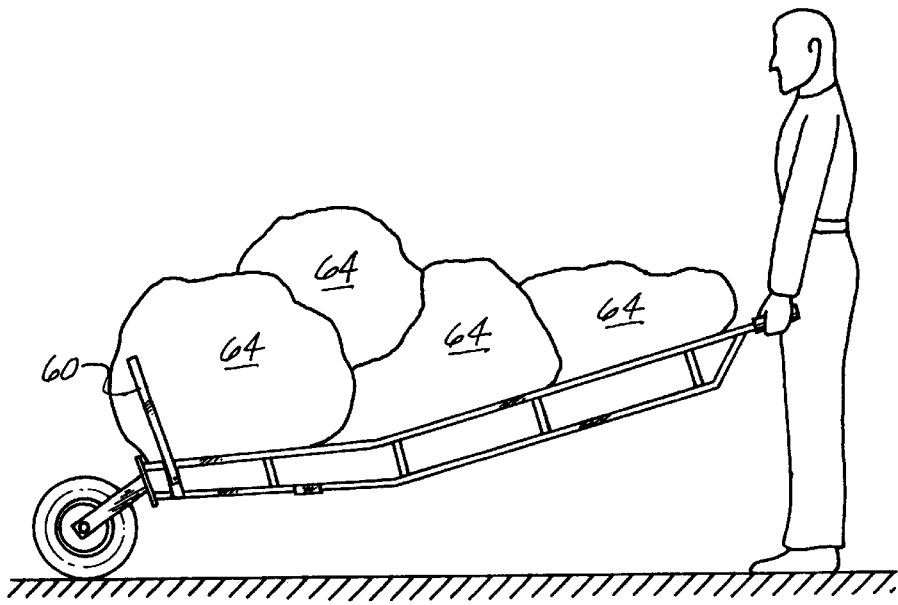
FIG. 5 is a side elevational view of the hunting cart used to transport decoys.
Figure 7:
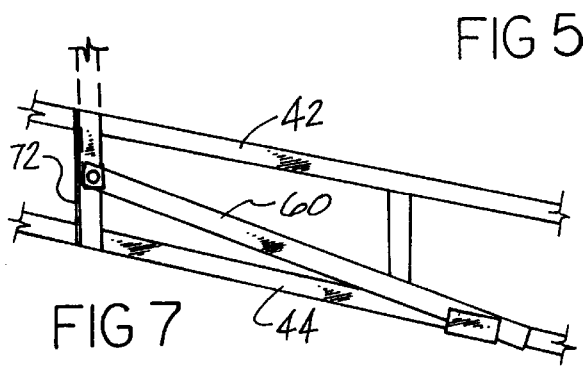
FIG. 7 is a view of the support tube arm in its folded down position.
Figure 3:
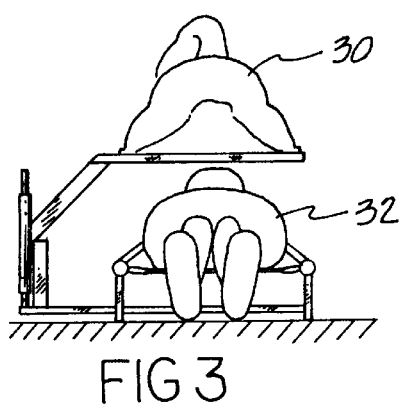
FIG. 3 is a rear end view of the decoy over the hunter.

The hunting decoy blind and cart apparatus is generally described by Reference 10. The cart 10 includes a frame structure 12, which is fabricated from welded steel or aluminum tubing and includes a pair of side walls 14 and 16. Positioned between the side walls is a woven hammock 18 which is stretched between the side walls 14 and 16 of the frame by a lacing 20 to provide a relatively taunt, but comfortable surface for a hunter in the supine position. The woven material can be of any weather resistant Nylon or Cordura, both of which are registered U.S. trademarks. The hammock fabric as well as the frame can be painted a camouflage color to blend with the surrounding habitat.

Frame members 14 and 16 as best seen in FIG. 2 include an upper tube 42 and a lower tube 44 separated by a series of spreader members 46, which increases its beam strength and lifts the hunter off the ground. The rear ends of upper tubes 42 carry hand grips 28. The front portion of each side frame 14 and 16, includes an elevated portion 68 which terminates at end plate 24. Wheel 22, which is a pneumatic tire is supported from end plate 24. Elevated portions 68 of both side frames are tapered together as seen in FIG. 4 and provide a headrest for the reclining hunter. A cross tube 48 is welded to the side frames 14 and 16 and provides a rigid frame structure along with end plate 24.

Figure 6:
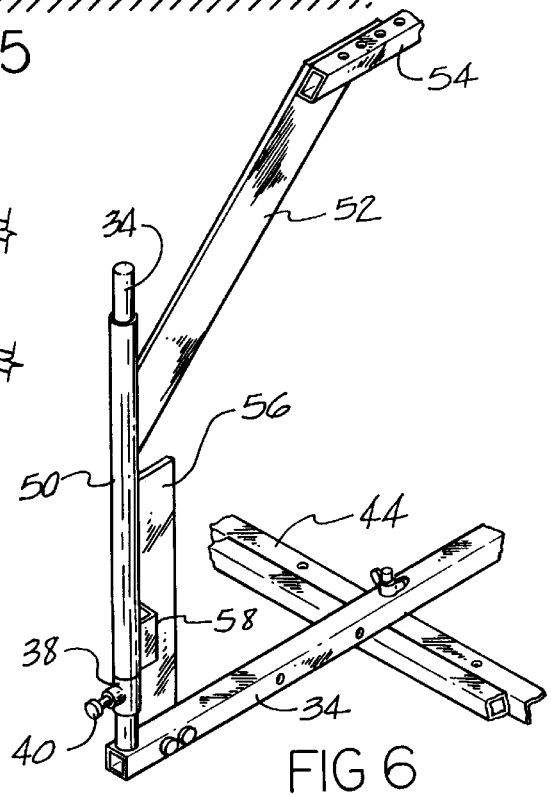
FIG. 6 is a perspective view of the support framework of the decoy to an enlarged scale.

The enlarged decoy 30, which hides the hunter, is supported by an offset framework structure which can be set up on either side of the cart 10 depending upon which side the hunter shoots from. The framework includes a lateral support tube 34, which is shown in FIG. 4, extending from the upper side of the cart. Support tube 34 is releasably attached by wing nuts to lower tube 44 as best seen in FIG. 6. Attached to the outer end of tube 34 is a vertically positioned shaft 36. Positioned on shaft 36 is a tube 50, to which is welded a lug 58 and a side arm 52. Side arm 52 in turn supports a horizontally positioned tube 54 having a series of holes which support decoy 30. Also attached to tube 34 is a stop plate 56 which is engaged by lug 58 carried on tube 50. To adjust the height of decoy 30, sleeve 38 can be raised or lowered by loosening bolt 40 to adjust the clearance between the hunter and the decoy. As the hunter pushes the decoy away from him and to the side, side arm 52 and its supporting tube 50 will move in a clockwise direction as seen in FIG. 6 until lug 58 comes in contact with stop 56. Pivotally attached to both side frames 14 and 16 through an angle iron section 72 is a support arm tube 60 as best seen in FIG. 5 in its extended position which provides a means for restricting decoy 64 from rolling off the front of the cart in its transport mode. Arms 60 are folded downwards as shown in FIG. 2 with the free end of the tube engaged by retention bracket 62. Angle iron 72 welded to tubes 44 and 42 provides a limit stop for the pivotally mounted arms 60.

The various parts of the support framework can be disassembled from the FIG. 6 position, and attached to the underside of frame 12 when not in use.

Having described my invention with the particularities set forth above, what is claimed is:

1. A hunting blind and cart apparatus comprising:
   an elongated frame including a pair of side walls and front and rear ends;
   a flexible hammock suspended between the side walls for supporting a hunter in the supine position;
   a wheel attached to the front end of said frame;
   a pair of hand engaging members attached to the rear end of the frame;
   an oversize bird decoy positioned over the frame;
   a support framework attached to the frame and offset to one side for support of the decoy over the hunter, the framework including a pivotal joint permitting the hunter to swing the decoy about a vertical axis to one side allowing the hunter to sit upright and shoot.

2. The hunting blind and cart apparatus as set forth in claim 1, wherein the side walls include a front portion tapered inward toward the wheel which is tilted upward relative to the remaining frame.

3. The hunting blind and cart apparatus as set forth in claim 1, including a pair of load restraining arms each pivotally connected to the side walls which fold flush against the frame when not in use and swing upward to a near vertical position against stop means to prevent the loaded material from rolling off the front end of the frame when used in a cart configuration.

4. The hunting blind and cart apparatus as set forth in claim 1, wherein the support framework can be attached to the frame on either side and includes a height adjustment sleeve for varying the height of the decoy above the hunter.

5. The hunting blind and cart apparatus as set forth in claim 1, wherein the frame includes a front portion which is tapered toward the wheel.

6. The hunting blind and cart apparatus as set forth in claim 1, wherein each sidewall is formed from welded metal tubing including an upper tube, a lower tube, and spreaders spaced between the upper and lower tubes to form a rigid truss.

* * * * *